(12) United States Patent
Kim et al.

(10) Patent No.: US 11,255,010 B2
(45) Date of Patent: Feb. 22, 2022

(54) ZINC-BASED PLATED STEEL SHEET HAVING POST-TREATED COATING FORMED THEREON

(71) Applicant: POSCO, Pohang-si (KR)

(72) Inventors: Yeon-Ho Kim, Gwangyang-si (KR); Yung-Keun Kim, Gwangyang-si (KR); Young-Jun Park, Gwangyang-si (KR); Yong-Woon Kim, Gwangyang-si (KR)

(73) Assignee: POSCO, Pohang-si (KR)

( * ) Notice: Subject to any disclaimer, the term of this patent is extended or adjusted under 35 U.S.C. 154(b) by 0 days.

(21) Appl. No.: 17/014,460

(22) Filed: Sep. 8, 2020

(65) Prior Publication Data

US 2020/0399750 A1 Dec. 24, 2020

Related U.S. Application Data

(63) Continuation-in-part of application No. 16/061,893, filed as application No. PCT/KR2016/015002 on Dec. 21, 2016, now abandoned.

(30) Foreign Application Priority Data

Dec. 22, 2015 (KR) .................. 10-2015-0183679

(51) Int. Cl.
    *B32B 15/04* (2006.01)
    *C23C 2/26* (2006.01)
    (Continued)

(52) U.S. Cl.
    CPC .............. *C23C 2/26* (2013.01); *B32B 15/013* (2013.01); *B32B 15/04* (2013.01); *B32B 15/043* (2013.01); *B32B 15/18* (2013.01); *C09D 1/00* (2013.01); *C23C 2/06* (2013.01); *C23C 2/40* (2013.01); *C23C 18/00* (2013.01); *C23C 20/00* (2013.01); *C23C 20/02* (2013.01); *C23C 20/04* (2013.01); *C23C 20/06* (2013.01); *C23C 22/00* (2013.01); *C23C 22/05* (2013.01); *C23C 22/06* (2013.01); *C23C 22/40* (2013.01); *C23C 22/46* (2013.01); *C23C 22/48* (2013.01); *C23C 22/53* (2013.01); *C23C 22/68* (2013.01); *C23C 22/74* (2013.01); *C23C 30/00* (2013.01); *C23C 30/005* (2013.01); *Y10T 428/1266* (2015.01); *Y10T 428/12556* (2015.01); *Y10T 428/12576* (2015.01); *Y10T 428/12597* (2015.01); *Y10T 428/12604* (2015.01); *Y10T 428/12611* (2015.01); *Y10T 428/12618* (2015.01); *Y10T 428/12667* (2015.01); *Y10T 428/12799* (2015.01);
    (Continued)

(58) Field of Classification Search
    CPC ......... C23C 30/00; C23C 30/005; C23C 2/26; C23C 2/06; C23C 2/40; C23C 18/00; C23C 22/74; C23C 22/40; C23C 22/00; C23C 22/05; C23C 22/06; C23C 22/46; C23C 22/48; C23C 22/53; C23C 22/68; C23C 20/00; C23C 20/02; C23C 20/04; C23C 20/06; B32B 15/04; B32B 15/013; B32B 15/043; B32B 15/18; Y10T 428/12597; Y10T 428/12604; Y10T 428/12611; Y10T 428/12618; Y10T 428/1266; Y10T 428/12667; Y10T 428/12799; Y10T 428/12972; Y10T 428/12979; Y10T 428/12993; Y10T 428/2495; Y10T 428/24967; Y10T 428/263; Y10T 428/264; Y10T 428/265; Y10T 428/26; Y10T 428/27; Y10T 428/12556; Y10T 428/12576; Y10T 428/12806; Y10T 428/12819; Y10T 428/12826; C09D 1/00
    See application file for complete search history.

(56) References Cited

U.S. PATENT DOCUMENTS

| | | |
|---|---|---|
| 4,775,427 A | 10/1988 | Portz et al. |
| 5,525,431 A | 6/1996 | Kanamaru et al. |

(Continued)

FOREIGN PATENT DOCUMENTS

| | | |
|---|---|---|
| CN | 1129017 | 8/1996 |
| CN | 104884671 | 9/2015 |

(Continued)

OTHER PUBLICATIONS

Chinese Office Action—Chinese Application No. 201680075455.7 dated Sep. 2, 2019, citing KR101322063, JP5638191, CN1129017, U.S. Pat. No. 4775427, CN104884671, JHP09268375 and JP2002194559.

(Continued)

*Primary Examiner* — Michael E. La Villa
(74) *Attorney, Agent, or Firm* — Cantor Colburn LLP

(57) ABSTRACT

Provided is a zinc-based plated steel sheet having a post-treated coating filmed thereon including: a steel sheet; a zinc plated layer formed on the steel sheet; and a post-treated coating formed on the plated layer, wherein the atomic ratio (O/M) of oxygen (O) to metals (M) contained in the post-treated coating is greater than 2 and less than 20, and a method for post-treating a zinc-based plated steel sheet. According to this, the zinc-based plated steel sheet having the post-treated coating formed thereon has the effects excellent in lubricity, weldability, adhesiveness, film-removing property and paintability. As the method of post-treating a zinc-based plated steel sheet of the present invention employs a simple coating method irrespective of the kind of plating layer, the process is simple and economical and the process operation cost is low.

2 Claims, No Drawings

(51) Int. Cl.

| | | |
|---|---|---|
| *C09D 1/00* | (2006.01) | |
| *C23C 22/40* | (2006.01) | |
| *C23C 18/00* | (2006.01) | |
| *C23C 20/00* | (2006.01) | |
| *C23C 2/40* | (2006.01) | |
| *C23C 22/46* | (2006.01) | |
| *C23C 20/02* | (2006.01) | |
| *C23C 20/04* | (2006.01) | |
| *C23C 20/06* | (2006.01) | |
| *C23C 22/68* | (2006.01) | |
| *C23C 30/00* | (2006.01) | |
| *B32B 15/01* | (2006.01) | |
| *C23C 22/06* | (2006.01) | |
| *C23C 22/48* | (2006.01) | |
| *C23C 22/00* | (2006.01) | |
| *C23C 22/53* | (2006.01) | |
| *C23C 2/06* | (2006.01) | |
| *B32B 15/18* | (2006.01) | |
| *C23C 22/74* | (2006.01) | |
| *C23C 22/05* | (2006.01) | |

(52) U.S. Cl.
CPC .......... *Y10T 428/12806* (2015.01); *Y10T 428/12819* (2015.01); *Y10T 428/12826* (2015.01); *Y10T 428/12972* (2015.01); *Y10T 428/12979* (2015.01); *Y10T 428/12993* (2015.01); *Y10T 428/2495* (2015.01); *Y10T 428/24967* (2015.01); *Y10T 428/26* (2015.01); *Y10T 428/263* (2015.01); *Y10T 428/264* (2015.01); *Y10T 428/265* (2015.01); *Y10T 428/27* (2015.01)

(56) References Cited

U.S. PATENT DOCUMENTS

| 5,861,218 | A | 1/1999 | Sakurai et al. |
| 6,129,995 | A | 10/2000 | Hashimoto et al. |
| 6,544,666 | B2 | 4/2003 | Ueda et al. |
| 9,662,523 | B2 | 5/2017 | Ji et al. |
| 2004/0089666 | A1 | 5/2004 | Nakazawa et al. |
| 2008/0149228 | A1 | 6/2008 | Taira et al. |
| 2015/0344702 | A1 | 12/2015 | Kim et al. |
| 2019/0315977 | A1* | 10/2019 | Kim .............. C08K 3/22 |

FOREIGN PATENT DOCUMENTS

| JP | 05033157 | 2/1993 |
| JP | 06146003 | 5/1994 |
| JP | 08296058 | 11/1996 |
| JP | 08296065 | 11/1996 |
| JP | 09254304 | 9/1997 |
| JP | 09268375 | 10/1997 |
| JP | 10018050 | 1/1998 |
| JP | 2001158972 | 6/2001 |
| JP | 2001323388 | 11/2001 |
| JP | 2002194559 | 7/2002 |
| JP | 2008208393 | 9/2008 |
| JP | 2014185381 | 10/2014 |
| JP | 5638191 | 12/2014 |
| KR | 19980080435 | 11/1998 |
| KR | 20010074527 | 8/2001 |
| KR | 20050047106 | 5/2005 |
| KR | 20050064066 | 6/2005 |
| KR | 101322063 | 10/2013 |

OTHER PUBLICATIONS

European Search Report—European Application No. 16879322.2, dated Aug. 24, 2018, citing US 2015/344702, U.S. Pat. No. 4,775,427 and Hamlaoui, et al.

Hamlaoui, et al., "Corrosion Protection of Electro-Galvanized Steel by Ceria-Based Coatings: Effect of Polyethylene Glycol(PEG) Addition", Journal of Materials Engineering and Performance, vol. 22, No. 9, Sep. 2013, pp. 2706-2715.

International Search Report—PCT/KR2016/015002 dated Mar. 3, 2017.

Japanese Office Action—Japanese Application No. 2018-531396 dated Jul. 30, 2019, citing JP 9-268375, JP 2002-194559 and JP 6-146003.

* cited by examiner

ZINC-BASED PLATED STEEL SHEET HAVING POST-TREATED COATING FORMED THEREON

TECHNICAL FIELD

The present disclosure relates to a zinc-based plated steel sheet having a post-treatment coating formed thereon and a post-treatment method thereof.

BACKGROUND ART

A zinc-based plated steel sheet used for an automobile panel is inexpensive, has excellent corrosion resistance, has a fine surface appearance, and usage thereof is increasing for automobile interior and exterior panels. During an automobile manufacturing process, a plated steel sheet is sequentially subjected to a pressing process, an assembling process such as welding and bonding, a debinding process, a phosphating process, and a painting process, and here, a zinc plated steel sheet is required to have physical properties such as lubricity, weldability, adhesiveness, decoatability, paintability, and the like.

The zinc-based plated steel sheet has different physical properties according to compositions of a plating layer formed on the steel sheet and manufacturing methods and inferior physical properties are required to be complemented. For example, in the case of a hot-dip galvanized steel sheet (GI) and an electrolytically galvanized steel sheet (EG), a soft plating layer is eliminated during pressing involving high-pressure and high-speed friction and fused to a bead part, or the like, of a die. This causes defects such as scratches and dents on a surface of the steel sheet. In particular, a plating layer composed of pure zinc, such as a hot dip galvanized steel sheet (GI), has a low melting point and the plating layer component is fused to and oxidized on an electrode surface due to a trace amount of aluminum (Al) contained therein during a welding process to form a non-conductive contaminant to degrade continuous welding points.

Further, in the case of the galvannealed steel sheet (GA), lubrication characteristics are insufficient during pressing due to a high coefficient of friction, and a powdering phenomenon in which a material itself is fractured or a hard plating layer is chipped off occurs. In addition, the zinc alloy plated steel sheet in which a trace amount of aluminum (Al) or magnesium (Mg) is included in a plating layer has excellent press formability but has low adhesiveness due to a stable metal oxide present in an extreme surface layer or has low continuous welding points during welding due to an alloy phase having a low melting point.

In order to solve the problems, a surface of the zinc-based plated steel sheet used as an automobile plate is required to be post-treatment, and thus, it is necessary to improve inferior physical properties.

Techniques regarding a post-treatment include a technique of forming a phosphate layer on a surface of a zinc plating layer (Korean Patent Laid-Open Publication No. 2001-0074527) and a technique of forming a metal oxide layer (Japanese Patent Laid-Open Publication No. JP-2014-185381). However, the technology of forming the phosphate layer requires processes such as surface conditioning, phosphate treatment, washing, drying, and the like, and requires considerable facility space and solution management at the time of an actual operation. Also, since it is a treatment method depending on reactivity with a plating layer, solution compositions must be changed according to types of the zinc-based plated steel sheet. Further, since the technique of forming a metal oxide layer is limited by metal components of a plating layer, it cannot be applied to every zinc-based plated steel sheet.

DISCLOSURE

Technical Problem

An aspect of the present disclosure is to provide a zinc-based plated steel sheet having excellent lubricity, weldability, adhesiveness, decoatability, and paintability, which are physical properties required for a sheet material for automobiles.

An aspect of the present disclosure is to provide a method for post-treating a zinc-based plated steel sheet through a simple and low-priced process.

Technical Solution

According to an aspect of the present disclosure, a zinc-based plated steel sheet having a post-treatment coating includes: a steel sheet; a zinc-based plating layer formed on the steel sheet; and a post-treatment coating formed on the plating layer, wherein the post-treatment coating includes metal oxide salt and an organic compound and an atomic ratio (O/M) of oxygen (O) to metals (M) included in the post-treatment coating is greater than 2 and smaller than 20.

The post-treatment coating includes a coating upper portion and a coating lower portion, an atomic ratio (O/M) of oxygen and metal of the coating upper portion may be greater than 5, and an atomic ratio (O/M) of oxygen and metal of the coating lower portion may be less than 5.

An atomic ratio (O/M) of oxygen and metal of the coating upper portion may be greater than 3.2, and an atomic ratio (O/M) of oxygen and metal of the coating lower portion may be less than 3.2.

A thickness of the coating lower portion may be ¼ to ¾ of the total thickness of the post-treatment coating.

The metal oxide salt may further include one or more selected from the group consisting of molybdenum (Mo), boron (B), silicon (Si), titanium (Ti), and zirconium (Zr).

According to another aspect of the present disclosure, a method for post-treating a zinc-based plated steel sheet includes: applying a post-treatment coating solution to a zinc-based plated steel sheet and drying the same to form a post-treatment coating, wherein an atomic ratio (O/M) of oxygen (O) to metals (M) included in the post-treatment coating is greater than 2 and smaller than 20.

The post-treatment coating includes a coating upper portion and a coating lower portion, an atomic ratio (O/M) of oxygen and metal of the coating upper portion may be greater than 5, and an atomic ratio (O/M) of oxygen and metal of the coating lower portion may be less than 5.

A thickness of the coating lower portion may be ¼ to ¾ of the total thickness of the post-treatment coating.

The post-treatment coating solution may have pH ranging from 3.0 to 7.0.

The post-treatment coating may have a coating weight ranging from 100 to 1000 mg/m².

Advantageous Effects

As set forth above, the zinc-based plated steel sheet having a post-treatment coating formed thereon according to an exemplary embodiment in the present disclosure has excellent lubricity, weldability, adhesiveness, decoatability, and paintability.

In addition, since the method of post-treating a zinc-based plated steel sheet according to the present disclosure employs a simple coating method regardless of kind of a plating layer, the process is simple and cost for a process operation is low, obtaining economical efficiency.

BEST MODE FOR INVENTION

Hereinafter, preferred exemplary embodiments of the present disclosure will be described with reference to various exemplary embodiments. However, the exemplary embodiments of the present disclosure may be modified to have various other forms, and the scope of the present disclosure is not limited to the exemplary embodiments described below.

The present disclosure relates to a zinc-based plated steel sheet having a post-treatment coating formed thereon and a post-treatment method thereof, and specifically, may provide a zinc-based plated steel sheet having a post-treatment coating, which includes a steel sheet, a zinc-based plating layer formed on the steel sheet, and a post-treatment coating formed on the plating layer, wherein the post-treatment coating includes metal oxide salt and an organic compound and an atomic ratio (O/M) of oxygen (O) to metals (M) included in the post-treatment coating is greater than 2 and smaller than 20.

The zinc-based plated steel sheet having the post-treatment coating of the present disclosure has excellent effects on lubricity, weldability, adhesiveness, decoatablity, and paintability, which are physical properties required for sheet material of automobiles.

During an automobile manufacturing process, an automobile sheet material sequentially undergoes a pressing process, an assembling process such as welding and bonding, a debinding process, a phosphating process, and a painting process, and here, the automobile sheet material is required to have physical properties such as lubricity, weldability, adhesiveness, decoatability, paintability, and the like. If lubricity is insufficient during the pressing process, powdering phenomenon in which a material itself is fractured or a hard plating layer is chipped off may occur. If weldability is insufficient during the assembling process, a welding electrode may be contaminated during welding to reduce an electrode life and continuous welding points, and if adhesiveness is insufficient, delamination may occur during tensile testing. Also, if decoatability is insufficient during the debinding process, the post-treatment coating may not be sufficiently removed to cause a defect during a phosphating treatment and a painting process and degrade paintability.

In order to improve lubricity, weldability, adhesiveness, decoatability, and paintability, which are physical properties required for an automobile manufacturing process, the zinc-based plated steel sheet of the present disclosure may include a post-treatment coating formed on a plating layer and the post-treatment coating may include metal oxide salt and an organic compound. Furthermore, an atomic ratio (O/M) of oxygen (O) to metals (M) contained in the post-treatment coating may be controlled to be greater than 2 and less than 20.

The atomic ratio (O/M) of oxygen (O) to metals (M) in the post-treatment coating is an average value per unit depth of nanometer scale using by X-ray photoelectron spectroscopy (XPS) after debinding the zinc-based plated steel sheet on which the post-treatment coating is formed thereon by acetone.

The content of oxygen contained in the post-treatment coating is an important condition for determining the physical properties of the zinc-based plated steel sheet. In particular, preferably, an atomic ratio (O/M) of oxygen (O) to metals (M) included in the post-treatment coating is preferably greater than 2 and less than 20, and more preferably, greater than 2 and less than 10.

If the atomic ratio (O/M) of the oxygen (O) and the metal (M) is 2 or less, the oxygen content in the post-treatment coating is excessively small so that a fraction of the metal oxide salt imparting lubricity between a press die and the steel sheet is too low to ensure lubricity, causing the plating layer to be eliminated or the material of the steel sheet to be fractured during pressing of the steel sheet. In addition, since the fraction of the metal oxide salt having a high melting point is lowered, contamination of an electrode is increased in the welding process to lower the electrode life and the continuous welding points, making it difficult to ensure weldability. In addition, bonding sites using oxygen as a medium such as oxo-ligand and hydroxyl group are insufficient to lower adhesiveness ensuring bonding strength between the zinc-based plated steel sheet and an adhesive.

Meanwhile, if the atomic ratio (O/M) of oxygen (O) to metals (M) is 20 or greater, the content of oxygen in the post-treatment coating may be excessively large. In particular, the fraction of bonding sites such as oxo-ligand or hydroxyl group may be increased to degrade decoatability. As a result, the post-treatment coating may not be sufficiently removed to cause a defect during a phosphating process and painting process and degrade paintability.

The post-treatment coating of the present disclosure may be divided into a coating upper portion and a coating lower portion. Preferably, an atomic ratio (O/M) of oxygen (O) to metals (M) of the coating upper portion is 5 or greater, and that of the coating lower portion is less than 5. More preferably, the atomic ratio (O/M) of oxygen (O) to metals (M) of the coating upper portion is 3.2 or greater, and that of the coating lower portion is less than 3.2.

In the present disclosure, the atomic ratio (O/M) of oxygen (O) to metals (M) of the coating upper portion may be controlled to have the oxygen content of 5 or greater. Accordingly, a surface layer of the zinc-based plated steel sheet of the present disclosure may have a high fraction of metal oxide salt to obtain excellent lubricity and weldability, and since bonding sites such as oxo-ligand and hydroxyl group are concentrated on the surface layer, affinity with an adhesive during the assembling process may be increased to ensure bonding strength.

Further, in the present disclosure, the atomic ratio (O/M) of oxygen (O) to metals (M) in the coating lower portion may be controlled to have the oxygen content of 5 or less. Accordingly, the coating lower portion may smoothly induce the decoatability of the post-treatment coating during a debinding process performed before the painting process, and thus, a defect is prevented during the phosphating process and the painting process, the follow-up processes, to ensure paintability, and corrosion resistance may be ensured due to the excellent paintability.

Meanwhile, a thickness of the coating lower portion may be ¼ to ¾ of a total thickness of the post-treatment coating, preferably, ⅓ to ⅔. If the thickness of the coating lower portion is less than ¼ of the total thickness of the post-treatment coating, the share of the coating lower portion having excellent decoatability may be so low to cause a defect during a phosphating treatment or electrodeposition coating, and if the thickness of the coating lower portion exceeds ¾, it may be difficult to ensure bonding strength of the adhesive due to shortage of adherence.

In the present invention, a method of controlling the atomic ratio (O/M) of oxygen (O) and metal (M) in the post-treatment coating is not particularly limited.

For example, the atomic ratio (O/M) of oxygen (O) and metal (M) may be controlled according to the type and content of the metallic oxysalt and organic compound. In addition, the atomic ratio (O/M) of oxygen (O) and metal (M) may be controlled according to the drying conditions of the coating. For example, by controlling the drying temperature and time to generate a condensation reaction in the coating, moisture can be removed and the metal/oxygen atomic ratio can be reduced.

The method of controlling the atomic ratio (O/M) of oxygen (O) and metal (M) in the upper and lower portions of the post-treatment coating is also not particularly limited. For example, the atomic ratio (O/M) of oxygen (O) and metal (M) in the upper and lower portions of the post-treatment coating may be controlled by using the difference in solubility of the composition for forming the post-treatment coating. Specifically, in the process of drying the composition after applying the composition for forming the post-treatment coating, a component that is first precipitated due to a difference in solubility may be disposed at a lower portion, and a component precipitated later may be disposed at an upper portion.

In the present invention, the metal oxide salt indicates a metallic oxysalt, and the metallic oxysalt may refer to a compound containing oxyacid as a metallic element. Specifically, the metallic oxysalt may be in the form of a combined salt of an anion of the metal oxyacid and a cation, a counter ion thereof.

For example, in the case of $Mo^{6+}$, an anion of the metal oxyacid may be $MoO_4^{2-}$, and $Na^+$ or $NH^{4+}$ may be used as a cation thereof. Examples of these salts may include $Na_2MoO_4$, $(NH_4)_6Mo_7O_{24}$, $(NH_4)_2Mo_2O_7$, and the like.

Further, the metallic oxysalt may include one or more of molybdate, borate, silicate, titanate, and zirconate.

Further, the metallic oxysalt may include one or more of a metallic oxyacid potassium salt, a metallic oxyacid sodium salt, a metallic oxyacid calcium salt, a metallic oxyacid magnesium salt, a metallic oxyacid ammonium salt, and a metallic oxyacid lithium salt.

Preferably, the metal oxide salt included in the post-treatment coating further includes at least one selected from the group consisting of molybdenum (Mo), boron (B), silicon (Si), titanium (Ti), and zirconium (Zr). Also, the post-treatment coating may be a post-treatment coating including phosphor (P) alone or may be a post-treatment coating including the metal oxide salt together with phosphor (P).

Meanwhile, the organic compound may not be limited as long as it is an organic compound containing a hydroxyl group (—OH). For example, the organic compound may be an organic compound including a function group such as a hydroxyl group, a carbonyl group, and the like. Further, for example, the organic compound may be a compound including polyvinyl acetate (PVAc), polyvinyl alcohol (PVA), polyacrylic acid (PAA), polyvinyl butyral (PVB), polyethylene glycol (PEG), and the like.

According to an exemplary embodiment of the present disclosure, there is provided a method of post-treating a zinc-based plated steel sheet, including applying a post-treatment coating solution to a zinc-based plated steel sheet and drying the same to form a post-treatment coating, wherein an atomic ratio (O/M) of oxygen (O) to metals (M) included in the post-treatment coating is greater than 2 and smaller than 20.

A coating method for post-treating the zinc-based plated steel sheet may include a dry coating method such as physical vapor deposition (PVD) or chemical vapor deposition (CVD), a powder spray coating method such as thermal spraying, a solution coating method such as roll coating, and the like. In the present disclosure, the post-treatment is performed by the solution coating method in which a post-treatment coating solution is simply applied to the plating layer regardless of type of the plating layer, and thus, the process is simple and cost for the process operation is low, which is economical.

The post-treatment coating formed by applying the post-treatment coating solution to the plating layer and drying the same preferably has an atomic ratio (O/M) of oxygen (O) to metals (M) greater than 2 and less than 20. The reason for controlling the atomic ratio to such a range is as described above.

The post-treatment coating of the present disclosure may be divided into an upper coating layer and a lower coating layer. Preferably, an atomic ratio (O/M) of oxygen and metal of the coating upper portion is 5 or greater and an atomic ratio (O/M) of oxygen and metal of the coating lower portion is less than 5. In addition, more preferably, an atomic ratio (O/M) of oxygen and metal of the coating upper portion is 3.2 or greater and an atomic ratio (O/M) of oxygen and metal of the coating lower portion is less than 3.2. A thickness of the coating lower portion may be ¼ to ¾ of the total thickness of the post-treatment coating, and preferably, ⅓ to ⅔. The reasons for controlling the atomic ratio of the coating upper portion and the coating lower portion to such a range and the reason for controlling the thickness of the coating lower portion are as described above.

Preferably, the metal oxide salt included in the post-treatment coating further includes at least one selected from the group consisting of molybdenum (Mo), boron (B), silicon (Si), titanium (Ti), and zirconium (Zr). As the metal oxide salt contained in the post-treatment coating solution, a solution in which metal oxide salt is colloidally dispersed or a solution in which metal oxide salt is dissolved in the form of an oxide may be used.

Meanwhile, the organic compound is not limited as long as it is an organic compound containing a hydroxyl group (—OH). For example, the organic compound may be an organic compound including a function group such as a hydroxyl group, a carbonyl group, and the like. Further, for example, the organic compound may be a compound including polyvinyl acetate (PVAc), polyvinyl alcohol (PVA), polyacrylic acid (PAA), polyvinyl butyral (PVB), polyethylene glycol (PEG), and the like.

The pH of the post-treatment coating solution is not limited but it preferably ranges from 3.0 to 7.0 in order to prevent the plating layer from being dissolved and to form a stable coating.

Mode for Invention

Hereinafter, the present disclosure will be described more specifically through specific embodiments. The following embodiments are provided to help understanding of the present disclosure and the scope of the present disclosure is not limited thereto.

EXAMPLES

Inventive Example 1

A zinc-based steel sheet having a thickness of 0.8 mm, an elongation of 36% to 37%, and a plating amount of 40 g/m$^2$ and including a plating layer in which Al is 2.5%, Mg is 3% and Zn is 94.5% was prepared. A coating solution containing metal oxide salt containing 1 wt % of Mo and 0.2 wt % of B, 0.3 wt % of PEG, and the balance being water was applied to the steel sheet by a bar coating method and then a post-treatment coating having a coating weight of 300 mg/m$^2$ was formed under a condition of PMT 100° C.

Inventive Example 2

A zinc-based steel sheet having a thickness of 0.8 mm, an elongation of 36% to 37%, and a plating amount of 40 g/m$^2$ and including a plating layer in which Al is 2.5%, Mg is 3% and Zn is 94.5% was prepared. A coating solution containing metal oxide salt containing 1 wt % of Mo and 0.5 wt % of B, 0.5 wt % of PEG, and the balance being water was applied to the steel sheet by a bar coating method and then a post-treatment coating having a coating weight of 300 mg/m$^2$ was formed under a condition of PMT 100° C.

Inventive Example 3

A zinc-based steel sheet having a thickness of 0.8 mm, an elongation of 36% to 37%, and a plating amount of 40 g/m$^2$ and including a plating layer in which Al is 2.5%, Mg is 3% and Zn is 94.5% was prepared. A coating solution containing metal oxide salt containing 1 wt % of Mo and 1 wt % of B, 1 wt % of PEG, and the balance being water was applied to the steel sheet by a bar coating method and then a post-treatment coating having a coating weight of 300 mg/m$^2$ was formed under a condition of PMT 100° C.

Inventive Example 4

A zinc-based steel sheet having a thickness of 0.8 mm, an elongation of 36% to 37%, and a plating amount of 40 g/m$^2$ and including a plating layer in which Al is 2.5%, Mg is 3% and Zn is 94.5% was prepared. A coating solution containing metal oxide salt containing 0.5 wt % of Mo and 1 wt % of B, 1.5 wt % of PEG, and the balance being water was applied to the steel sheet by a bar coating method and then a post-treatment coating having a coating weight of 300 mg/m$^2$ was formed under a condition of PMT 100° C.

Comparative Example 1

A zinc-based steel sheet having a thickness of 0.8 mm, an elongation of 36% to 37%, and a plating amount of 40 g/m$^2$ and including a plating layer in which Al is 2.5%, Mg is 3% and Zn is 94.5% was prepared, and a post-treatment coating was not formed on the steel sheet.

Comparative Example 2

A zinc-based steel sheet having a thickness of 0.8 mm, an elongation of 36% to 37%, and a plating amount of 40 g/m$^2$ and including a plating layer in which Al is 2.5%, Mg is 3% and Zn is 94.5% was prepared. A coating solution containing metal oxide salt containing 1 wt % of Mo, 0.1 wt % of PEG, and the balance being water was applied to the steel sheet by a bar coating method and then a post-treatment coating having a coating weight of 300 mg/m$^2$ was formed under a condition of PMT 100° C.

Comparative Example 3

A zinc-based steel sheet having a thickness of 0.8 mm, an elongation of 36% to 37%, and a plating amount of 40 g/m$^2$ and including a plating layer in which Al is 2.5%, Mg is 3% and Zn is 94.5% was prepared. A coating solution containing metal oxide salt containing 1 wt % of Mo and 0.5 wt % of B, 3 wt % of PEG, and the balance being water was applied to the steel sheet by a bar coating method and then a post-treatment coating having a coating weight of 300 mg/m$^2$ was formed under a condition of PMT 100° C.

The atomic ratios (O/M) of oxygen (O) to metals (M) in the post-treatment coatings of Inventive Examples 1 to 4 and Comparative Examples 1 to 3 were measured and shown in Table 1. The atomic ratio is an average value per unit depth of nanometer scale using an X-ray photoelectron spectroscopy (XPS) method after acetone-debinding the zinc-based plated steel sheet on which the post-treatment coating is formed. A boundary between an upper portion and a lower portion was half of a total thickness. In order to evaluate physical properties according to the atomic ratio (O/M) conditions of oxygen (O) to metals (M), processability, adhesion and decoatability were evaluated and the results are shown in Table 1.

Evaluation of Processibility

A cup drawing test was carried out to evaluate processibility. In the cup drawing test, a tester including a mold and a punch was used. Testing was performed, while increasing a blank holding force (BHF), and a BHG value immediately before material fracture occurred was determined as a maximum BHF value and written in Table 1. As the maximum BHF value is higher, workability is better. Detailed conditions of the cup drawing test carried out in this example are as follows.

※ Detailed conditions of cup drawing test
Punch diameter: 50 mm
Punch edge radius: 6 mm
Die diameter: 52.25 mm
Punch movement rate: 230 mm/min
Post-treatment coating was in contact with mold and testing was performed after applying washing oil to surface of the post-treatment coating

Evaluation of Adhesion

For an adhesion test, two 25 mm×100 mm samples were manufactured, and after washing oil was applied to the samples, the samples were erected and left as is for one day. Thereafter, a mastic sealer adhesive was applied with a size of 25 mm (width)×25 mm (length)×3 mm (height) to an inner side by 10 mm from the end of one sample and the other sample was folded thereon, which were then cured at 170° C. for 20 minutes. Thereafter, adhesion shear strength of the upper and lower samples was measured and the results thereof are shown in Table 1. The shear strength was measured at a speed of 50 mm/min and a measured maximum shear force was divided by an adhesion area of 6.25 cm$^2$.

Evaluation of decoatability

For a decoatability test, a material was stirred and dipped at 50 to 55° C. for 2 minutes using a degreasing solution used in an automobile manufacturing process and subsequently washed, and an amount of coating remaining on a surface of the material was measured, a decoating rate to a coating weight of the coating before degreasing was calculated by percentage and shown in Table 1. For the remaining amount of coating, a coating layer having a predetermined area was dissolved with an acid solution, and the content of molybdenum of the solution was analyzed quantitatively with inductively coupled plasma (ICP) to calculate a remaining amount per area.

TABLE 1

| Classification | O/M* of entire post-treatment coating | O/M of lower post-treatment coating | Maximum BHF (ton) | Bonding strength (kgf/cm$^2$) | Decoating rate (%) |
|---|---|---|---|---|---|
| Inventive Example 1 | 3.2 | 1.9 | 10 | 4.0 | 97 |
| Inventive Example 2 | 7.2 | 2.4 | 12 | 5.2 | 95 |
| Inventive Example 3 | 10.1 | 3.1 | 14 | 5.5 | 96 |
| Inventive Example 4 | 19.2 | 4.7 | 13 | 5.5 | 95 |
| Comparative example 1 | Not treated | — | 7 | 0.5 | — |
| Comparative example 2 | 1.8 | 1.5 | 8 | 1.1 | 98 |
| Comparative example 3 | 25.3 | 6.2 | 14 | 5.3 | 87 |

*O/M is an atomic ratio of oxygen (O) to metals (M)

As shown in Table 1, it can be seen that, in Inventive Examples 1 to 6 in which the post-treatment coating was formed, the maximum BHF value and the bonding strength were significantly higher than those in Comparative Example 1 in which post-treatment was not performed, and thus, Inventive Examples 1 to 6 have excellent processability and adhesiveness as physical properties that may be used as a sheet material of automobiles.

It was also confirmed that Inventive Examples 1 to 6 in which the atomic ratio (O/M) of oxygen (O) to metals (M) is greater than 2 and less than 20 had a decoating rate of 95% or greater, exhibiting excellent decoatability. However, in Comparative Example 2 in which the atomic ratio (O/M) of oxygen (O) to metals (M) is 2 or less, processability and adhesiveness are inferior and, in Comparative Example 3 in which the atomic ratio (O/M) of oxygen (O) to metals (M) is 20 or greater, processability and adhesiveness were good but has an inferior decoating rate because the decoating rate is 87% or less.

While exemplary embodiments of the present disclosure have been shown and described above, it will be apparent to those skilled in the art that modifications and variations could be made without departing from the scope of the present disclosure as defined by the appended claims.

What is claimed are:

1. A zinc-based plated steel sheet having a post-treatment coating, the zinc-based plated steel sheet comprising:
    a steel sheet;
    a zinc-based plating layer formed on the steel sheet; and
    a post-treatment coating formed on the zinc-based plating layer, wherein the post-treatment coating includes a coating upper portion and a coating lower portion, a thickness of the coating lower portion being ¼ to ¾ of a total thickness of the post-treatment coating,
    wherein the post-treatment coating includes a metal oxide salt and an organic compound, the metal oxide salt including at least one metal selected from the group consisting of molybdenum (Mo), titanium (Ti), and zirconium (Zr), and
    wherein an atomic ratio (O/M) of oxygen (O) to metal (M) derived from a metal oxide salt included in the post-treatment coating is greater than 2 and smaller than 20,
    an atomic ratio (O/M) of oxygen and metal derived from a metal oxide salt of the coating upper portion is greater than 3.2, and
    an atomic ratio (O/M) of oxygen and metal derived from a metal oxide salt of the coating lower portion is less than 5.

2. The zinc-based plated steel sheet of claim 1, wherein the atomic ratio (O/M) of oxygen and metal derived from the metal oxide salt of the coating upper portion is greater than 5, and
    an atomic ratio (O/M) of oxygen and metal derived from the metal oxide salt of the coating lower portion is less than 3.2.

* * * * *